US006272859B1

(12) United States Patent
Barnes et al.

(10) Patent No.: US 6,272,859 B1
(45) Date of Patent: Aug. 14, 2001

(54) DEVICE FOR CONTROLLING A VARIABLE GEOMETRY TURBOCHARGER

(75) Inventors: Travis E. Barnes, Loveland, CO (US); Gerald N. Coleman, Peoria, IL (US); Michael S. Lukich, Chillicothe, IL (US); Scott E. Nicholson, Metamora, IL (US); Paul M. Young, Cary, NC (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/165,756

(22) Filed: Oct. 2, 1998

(51) Int. Cl.[7] .................................................... F02B 37/12
(52) U.S. Cl. ............................................................ 60/602
(58) Field of Search ................................. 60/602, 597, 11

(56) References Cited

U.S. PATENT DOCUMENTS

| 4,671,068 | 6/1987 | Moody et al. | 60/602 |
|---|---|---|---|
| 4,776,757 | 10/1988 | Sedille et al. | 415/164 |
| 5,028,208 | 7/1991 | Mitsubori et al. | 415/150 |
| 5,123,246 | 6/1992 | Younessi et al. | 60/602 |
| 5,372,485 | 12/1994 | Sumser et al. | 417/407 |
| 5,454,225 | 10/1995 | Sumser et al. | 60/602 |
| 5,560,208 | 10/1996 | Halimi et al. | 60/607 |
| 5,605,044 | 2/1997 | Zimmer et al. | 60/602 |

FOREIGN PATENT DOCUMENTS

| 3322436 | 1/1985 | (DE) | F02C/6/12 |
|---|---|---|---|
| 3833906 | 5/1989 | (DE) | F02C/9/20 |
| 0 599 321 A1 | * 6/1994 | (EP) . | |

* cited by examiner

Primary Examiner—Noah P. Kamen
(74) Attorney, Agent, or Firm—Haverstock Garrett & Roberts

(57) ABSTRACT

The present invention is an apparatus for controlling a variable geometry turbocharger (VGT) in closed loop and open loop modes, and a switching mechanism for determining whether open loop or closed loop control laws should be used. In the closed loop mode, a correction factor, obtained from a pressure correction map based on engine speed and atmospheric pressure, is subtracted from the desired boost pressure to prevent overspeed of the turbocharger at lower atmospheric pressures. The actual boost pressure is then compared to the desired boost pressure after correction to obtain a boost pressure error signal. The boost pressure error signal is used as an input to a proportional integral differential control law that responsively produces a desired VGT vane position. A minimum limit on the desired VGT vane position is based on engine speed and fuel quantity, whereas a maximum allowable vane position may be a predetermined constant or function. A linearization map is used to obtain a VGT current signal that is transmitted to an actuator for moving the vane position.

11 Claims, 3 Drawing Sheets

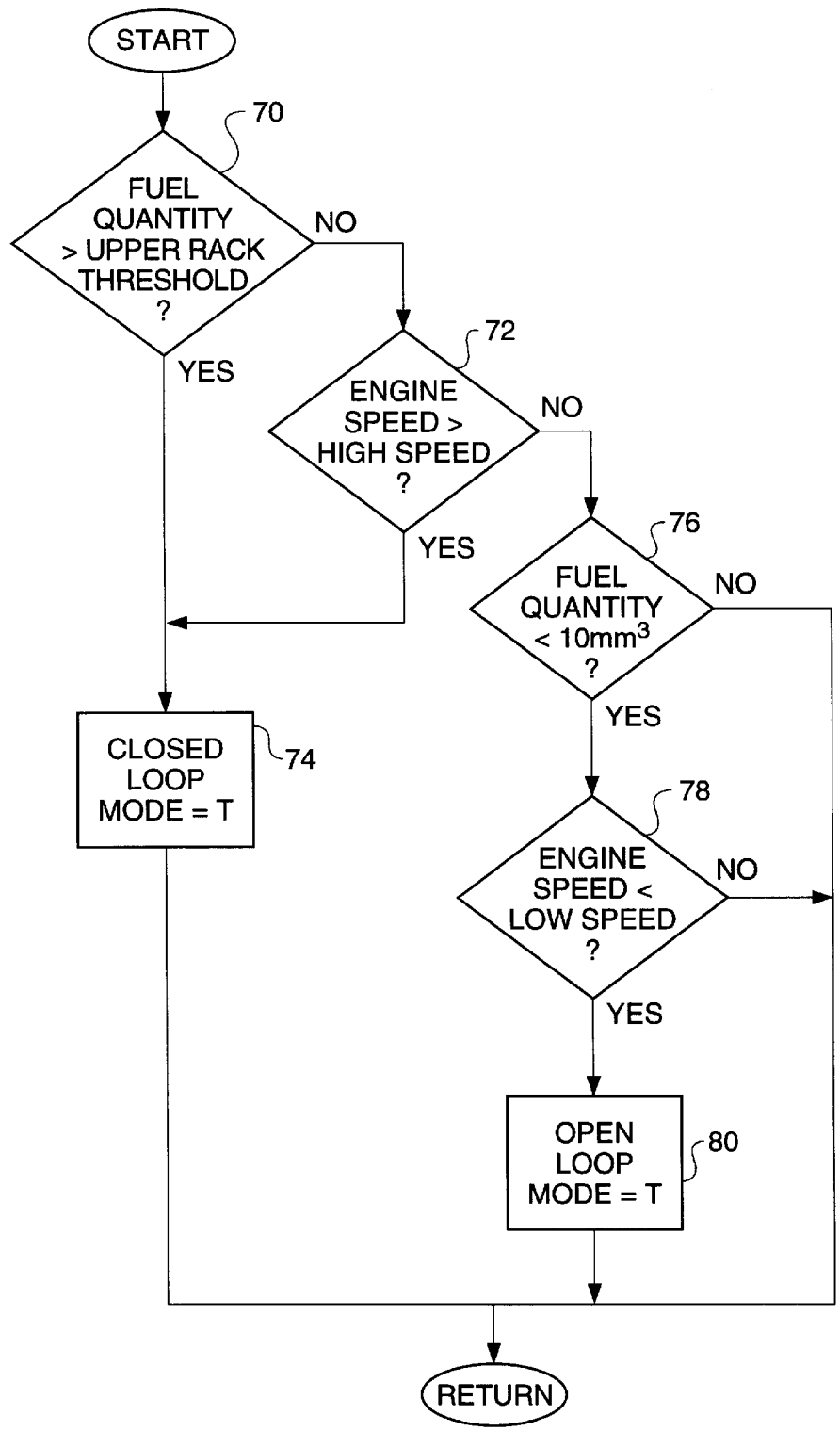

DEVICE FOR CONTROLLING A VARIABLE GEOMETRY TURBOCHARGER

TECHNICAL FIELD

The present invention relates generally to turbocharger control systems and, more particularly, to a control system for a variable geometry turbocharger.

BACKGROUND

Turbochargers are conventionally used in internal combustion engines to increase the amount of injected intake air so as to increase the output of the engine. In general, the turbocharger consists of a turbine wheel mounted in the exhaust manifold of the engine and a compressor coupled to the turbine wheel and mounted in the intake manifold of the engine. As exhaust gases flow past the turbine wheel it is rotated, causing the compressor to also rotate which increases the pressure of the intake air being charged into the engine cylinders, mixing with fuel and thereafter undergoing combustion.

A known objective with turbocharger design is the attainment of efficient operation over the entire range of operating speeds of the engine. For example, if a turbocharger is designed to provide maximum torque at low engine speeds, at high engine speeds the turbine wheel will rotate at an excessive speed, eventually causing damage by supplying too much air to the engine, and causing excessive wear of the turbocharger parts. On the other hand, if a turbocharger is provided to operate most efficiently at high engine speeds, the efficiency of the turbocharger will be undesirably low when the engine is running at low speeds.

Variable geometry components in the turbocharger compressor, the turbocharger turbine, or both, commonly include variable nozzle vanes ahead of the turbine wheel and/or variable diffuser vanes in the compressor component. Variable nozzle vanes ahead of the turbine wheel are connected together so that the throat area of each nozzle passage can be reduced over the low engine speed range and increased as the engine speed approaches its maximum, so that the turbocharger speed is kept within a safe operating range.

An internal combustion engine may operate in a variety of different closed loop and open loop modes based upon a variety of monitored engine operating parameters. Some typical operating closed loop modes include a cold mode, a warm mode, a cranking mode, a low idle mode, and a high idle mode. In-between the low idle mode and the high idle mode, the engine runs in an open loop mode where fuel is delivered based on engine throttle position and engine speed. Various engine operating parameters may be monitored to determine the engine operating mode including engine speed, throttle position, vehicle speed, coolant temperature, and oil temperature, as well as others. In each operating mode it is not uncommon to use different techniques to determine the amount of fuel to deliver to the engine during a fuel delivery cycle. For example, different fuel rate maps might be utilized in two different modes or a fuel rate map might be used in one mode, and in another mode an engine speed governor with closed loop control may be used. An electronic control module that regulates the quantity of fuel that the fuel injector dispenses includes software in the form of maps or multi-dimensional lookup tables that are used to define optimum fuel system operational parameters. One of these maps may be a torque map which uses the actual engine speed signal to produce the maximum allowable fuel quantity signal based on the horsepower and torque characteristics of the engine. Another map may be the emissions, or smoke limiter map, which limits the amount of smoke produced by the engine as a function of air manifold pressure or boost pressure, ambient temperature and pressure, and engine speed. The maximum allowable fuel quantity signal produced by the smoke map limits the quantity of fuel based on the quantity of air available to prevent excess smoke.

Various control systems for VGTs are known in the art. U.S. Pat. No. 5,123,246 pertains to a control system that takes into account engine operating parameters, but does not disclose means for controlling the engine during different operating modes. U.S. Pat. No. 4,671,068 teaches a control system for a VGT that switches between open loop and closed loop modes, using atmospheric pressure and boost pressure. It is often desirable, however, to use different engine operating parameters to determine when to switch between open loop and closed loop modes.

Accordingly, the present invention is directed to overcoming one or more of the problems as set forth above.

DISCLOSURE OF THE INVENTION

The present invention is an apparatus for controlling a variable geometry turbocharger (VGT) in closed loop and open loop modes, and a switching mechanism for determining whether open loop or closed loop control laws should be used. In the closed loop mode, a correction factor, obtained from a pressure correction map based on engine speed and atmospheric pressure, is subtracted from the desired boost pressure to prevent overspeed of the turbocharger at lower atmospheric pressures. The actual boost pressure is then compared to the desired boost pressure after correction to obtain a boost pressure error signal. The boost pressure error signal is used as an input to a proportional integral differential control law that responsively produces a desired VGT vane position. A minimum limit on the desired VGT vane position is based on engine speed and fuel quantity signal, whereas a maximum allowable vane position may be a predetermined constant or function. A linearization map is used to obtain a VGT current signal that is transmitted to an actuator for moving the vane position.

BRIEF DESCRIPTION OF DRAWINGS

FIG. 3 is a logic flowchart for determining whether open loop or closed loop control is used.

BEST MODE FOR CARRYING OUT THE INVENTION

Figure 1:
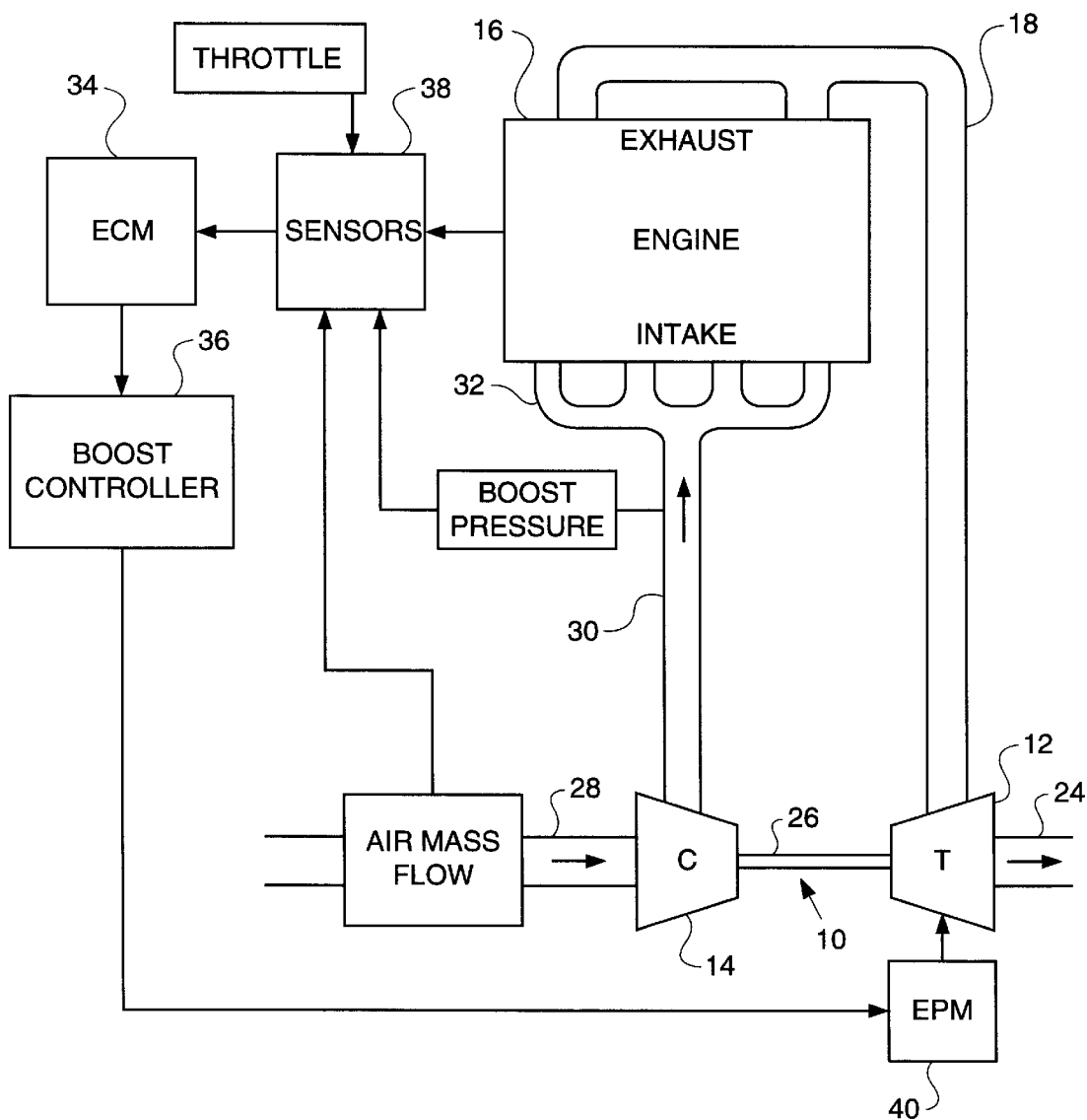
FIG. 1 is a block diagram of an engine including a turbocharger with which the present device may be utilized.

Throughout the specification and figures, like reference numerals refer to like components or parts. Referring to FIG. 1, there is shown a variable geometry turbocharger (VGT) of the variable nozzle vane type. The VGT 10 comprises a turbine chamber 12 and a compressor chamber 14. The turbine chamber 12 receives hot exhaust gases from the cylinders of an internal combustion engine 16 via an exhaust intake pipe 18. Upon entering the turbine chamber 12, the exhaust gases are directed through circumferentially disposed nozzle vanes (not shown) onto the blades of a rotary turbine wheel (not shown). The spent exhaust gases are then discharged from the turbine chamber 12 into an exhaust pipe 24.

The radial angle of the nozzle vanes determine the angle of attack at which the exhaust gases flow into the blades of the turbine wheel. The angle of the nozzle vanes may be varied from fully open to fully closed positions to vary the speed of the turbine wheel. As the nozzle vanes progressively open, the angle of attack becomes progressively lower, decreasing both turbine wheel speed and exhaust gas backpressure.

The turbine wheel rotatably drives a compressor wheel (not shown) via shaft 26. The compressor chamber 14 receives combustion air from an air intake pipe 28. The driven compressor wheel is adapted to compress and discharge air at greater than atmospheric pressure into an air conduit 30. Fuel is injected into the engine cylinder via a fuel injector (not shown) and air is directed to the engine cylinders via an intake manifold 32. The engine 16 operates in either a vacuum mode wherein the nozzle vanes are opened and substantially no boost is provided by the VGT 10, or a pressure (boost) mode wherein the nozzle vanes are closed and the VGT 10 compresses the intake air in excess of atmospheric pressure.

The control system of the present invention includes a microcomputer based electronic control module (ECM) 34 and a boost controller 36. The ECM 34 receives inputs from sensors 38 relating to vehicle speed, air mass flow, engine coolant temperature, throttle position, the amount of fuel injected per cycle (fuel quantity), and actual boost pressure. The sensors utilized in the present invention are of types which are well known in the art and are therefore not described in detail herein.

Figure 2:
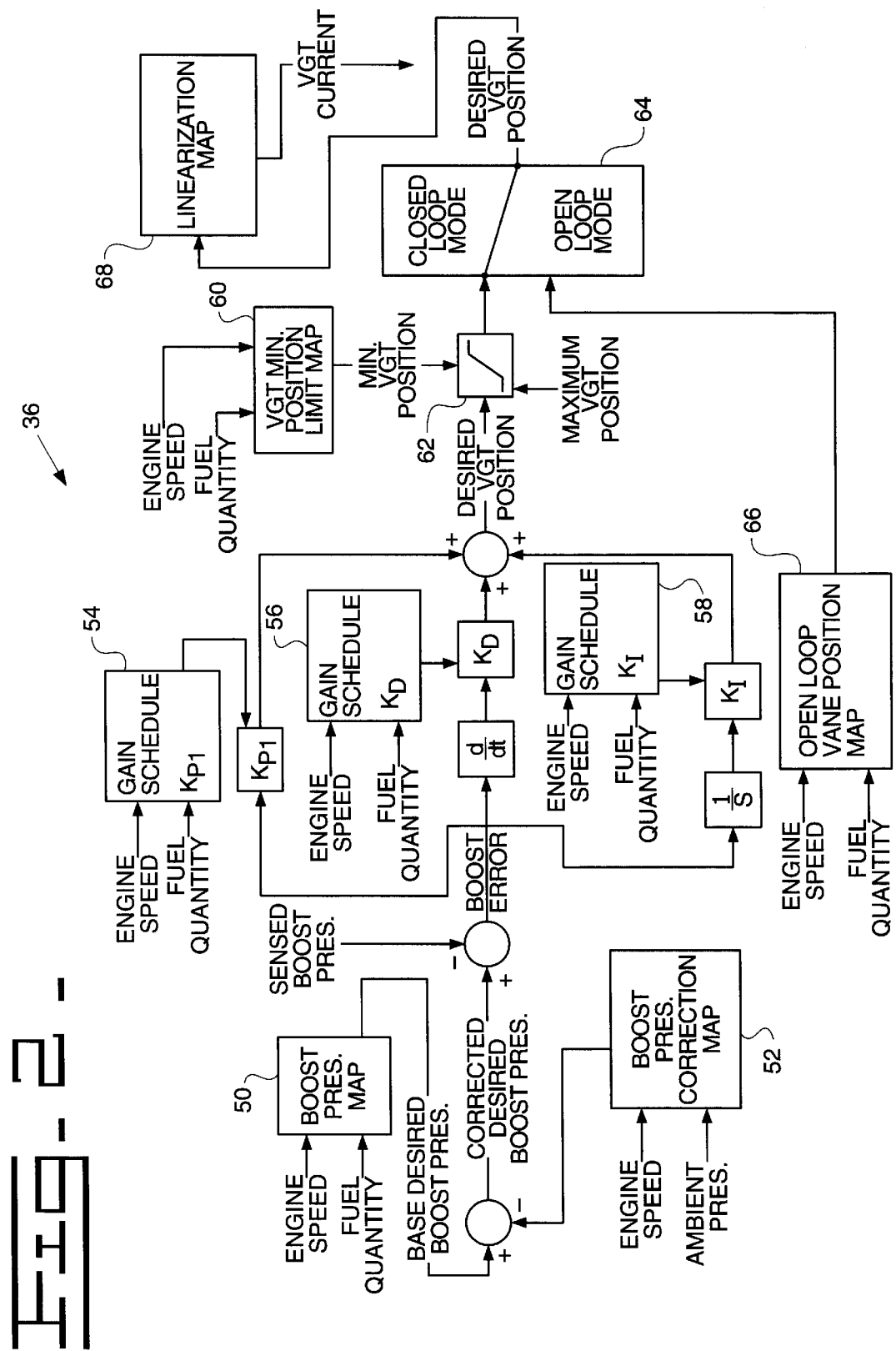
FIG. 2 is a block diagram view of the present invention for controlling a variable geometry turbocharger.

The boost controller 36 receives ECM output signals and transmits signals to an electronic pressure modulator (EPM) 40, which controls opening and closing of the nozzle vanes. As shown in the block diagram of the boost controller 36 in FIG. 2, when the engine is operating in the closed loop boost mode, the input to the boost controller 36 is a desired boost pressure, and the closed-loop boost controller outputs a current signal corresponding to the desired VGT nozzle vane position. A base desired boost pressure signal is output from a boost pressure map 50, which may be implemented in software as a table look-up routine. In the present invention, the desired boost pressure is a function of engine speed and the amount of fuel being delivered to the engine. The base desired boost pressure map 50 contains the standard desired boost pressure for a given ambient pressure. In order to help prevent turbocharger overspeed at ambient pressures that are lower than the base ambient pressure, a boost pressure correction map 52, which is a function of engine speed and ambient pressure, is used to adjust the base desired boost pressure. The boost pressure correction map 52, as well as the other maps that are used in the boost controller 36, may be implemented in a table look-up routine or as a formula that may be programmed in software. Since the ambient pressure changes at relatively slow rates, the table look-up routine or calculation of the formula may be performed at frequencies ranging from approximately 1 Hertz to 10 Hertz.

A boost error signal is formed by subtracting the actual, or sensed, boost pressure from the corrected desired boost pressure signal. The boost controller 36 forms a desired VGT position from the boost error signal using a proportional-integral-differential (PID) control law with gain schedules 54, 56, 58 that are functions of engine speed and fuel quantity. The PID control law is of a type that is well known in the art, however, the gain schedules 54, 56, 58 are unique for each different type of engine with which the present is utilized. The optimum gain schedules may be determined for a particular engine using classical or modern control theory design and analysis methods, which are well known to those skilled in the art. The desired VGT position is then limited to be greater than or equal to a minimum limit and less than or equal to a maximum limit. The limit function may be implemented in computer software or electronic hardware. The minimum VGT position limit is derived from a VGT minimum position limit map 60, which is a function of engine speed and fuel quantity signals. The maximum VGT position limit is a predetermined constant that may be chosen to represent a physical position limit or a position that corresponds to the maximum angle of attack of the air flow desired on the turbine wheel blades. The maximum VGT position limit may also be implemented as a variable function, depending on the engine being used.

When the VGT is operated in an open loop mode, the desired VGT position is determined using an open loop vane position map 66, which is a function of engine speed and the fuel quantity signal.

A switching mechanism 64 is used to control selection between closed-loop and open loop control. The logic associated with the switching mechanism 64 is shown in FIG. 3. The logic may be implemented in software and executed prior to executing the software that implements the closed loop and open loop control. In this manner, data processing time may be conserved if the switch is used to control execution of either the closed loop or open loop control software. As shown in FIG. 3, if the fuel quantity signal exceeds an upper threshold value, as determined by decision block 70, or if the engine speed exceeds an upper engine speed threshold, as determined by decision block 72, the closed loop control mode is enabled in block 74. Otherwise, if the fuel quantity signal is less than a lower fuel quantity threshold, as determined by decision block 76, and the engine speed is less than a lower engine speed threshold, as determined by decision block 78, then the open loop mode is enabled in block 80. In order to avoid toggling between open loop and closed loop modes, there is a hysteresis gap between preferred values for the upper and lower threshold values for the engine speed signal and the fuel quantity signal. For example, the upper fuel quantity threshold value may be set to 15 cubic millimeters and the lower fuel quantity threshold value may be set to 10 cubic millimeters. Similarly, the the upper engine speed threshold value may be set to 3200 RPM and the lower engine speed threshold value may be set to 3000 RPM. With a gap of 5 cubic millimeters between the upper and lower fuel quantity signal threshold values, and a gap of 200 RPM between the upper and lower engine speed threshold values, the mode switch will not change until the engine parameters are well within an operating region. The values for the threshold limits depend on the performance characteristics of a given engine and may be predetermined constants or variables defined by a function or data table.

Once the selected, desired VGT position signal is determined, a linearization map 68 is used to linearize the desired VGT position signal to an electric current value. The VGT current value is transmitted to the EPM 40 to move the turbine vanes.

INDUSTRIAL APPLICABILITY

The control system of this invention effects stable and accurate control of the VGT 10. The VGT control signal varies from one extreme calling for maximum boost to the other extreme calling for minimum exhaust gas backpressure. The primary engine operating parameters that are taken into account in determining the VGT control signal in both the closed loop and open loop modes are the fuel quantity signal and engine speed. The fuel quantity signal value is directly proportional to the load on the engine, and therefore, the fuel quantity signal value along with the engine speed provide accurate indicators of the level of boost pressure required. As a result, the boost controller 36 commands vane positions that provide fast air system response at low engine speed and enhances engine power efficiency at high engine speeds. Further, the gain schedules 54, 56, 58 may be designed so that the vanes respond quickly to large errors in boost pressure, and more slowly to smaller errors to enhance engine performance and control stability.

Other aspects, objects and advantages of the present invention can be obtained from a study of the drawings, the disclosure and the appended claims.

What is claimed is:

1. An apparatus for controlling a variable geometry turbocharger, comprising:
    a first sensor operable to provide an engine speed signal
    a second sensor operable to provide a fuel quantity signal;
    a data processor coupled with the first and second sensors to receive the engine speed signal and the fuel quantity signal, the data processor operable to store at least one engine operating map including a desired boost pressure map, the desired boost pressure map being a function of engine speed and fuel quantity, the data processor being further operable to generate a desired boost pressure signal based on the desired boost pressure map, the engine speed signal, and the fuel quantity signal;
    a closed loop control circuit coupled with the data processor to receive the desired boost pressure signal, the closed loop control circuit operable to generate a first desired nozzle vane position based on the desired boost pressure signal;
    an open loop control circuit coupled with the first and second sensors to receive the engine speed and the fuel quantity signals, the open loop control circuit operable to generate a second desired nozzle vane position based on the engine speed signal and fuel quantity signals; and
    a switching circuit coupled with the first and second sensors and the closed and open loop control circuits, the switching circuit operable to transmit one of the first and second desired nozzle vane positions as a function of the engine speed and the fuel quantity;
    wherein the data processing means is further operable to generate a corrected desired boost pressure signal by summing the desired boost pressure signal with a boost pressure correction signal, the boost pressure correction signal being generated from a boost pressure correction map, the engine speed signal, and an atmospheric pressure signal from an atmospheric pressure sensor.

2. The apparatus, as set forth in claim 1, wherein the switching circuit is operable to transmit the second desired nozzle vane position when the fuel quantity signal is below a lower fuel quantity threshold value and the engine speed signal is below a lower engine speed threshold value and is operable to transmit the first desired nozzle vane position when the fuel quantity signal is above an upper fuel quantity threshold value or the engine speed signal is above an upper engine speed threshold value.

3. The apparatus, as set forth in claim 1, wherein the switching circuit is operable to transmit the second desired nozzle vane position when the fuel quantity signal is below a lower fuel quantity threshold value and the engine speed signal is below a lower engine speed threshold value and is operable to transmit the first desired nozzle vane position when the fuel quantity signal is above an upper fuel quantity threshold value or the engine speed signal is above an upper engine speed threshold value.

4. The apparatus, as set forth in claim 3, wherein a hysteresis gap is included between the upper and lower engine speed threshold values and the upper and lower fuel quantity threshold values.

5. The apparatus, as set forth in claim 2, further comprising a limit circuit coupled with the closed loop control circuit to receive the first desired vane position, the limit circuit operable to limit the first vane position signal to be within a first and second predetermined value, the first predetermined value being a function of engine speed and fuel quantity.

6. A method for controlling a variable geometry turbocharger having a vane, comprising:
    determining an engine speed;
    determining a fuel quantity;
    determining a closed loop vane position as a function of the engine speed and the fuel quantity;
    determining an open loop vane position as a function of the engine speed and the fuel quantity; and
    selecting one of the closed and open loop vane positions as a function of the engine speed and fuel quantity;
    wherein selecting one of the closed and open loop vane positions comprises:
    selecting the closed loop vane position when the fuel quantity is greater than a first predetermined value or the engine speed is greater than a second predetermined value; and
    selecting the open loop vane position when the fuel quantity is less than a third predetermined value and the engine speed is less than a fourth predetermined value.

7. The method of claim 6, further comprising determining an ambient pressure, and wherein the closed loop vane position is further a function of the ambient pressure. comprising:
    an exhaust gas turbine having an exhaust intake pipe connected to receive exhaust gas from an internal combustion engine, the exhaust gas turbine having a rotating turbine wheel therein, the turbine wheel being mounted on a shaft to rotate therewith;
    a plurality of nozzle vanes disposed between the exhaust intake pipe and the turbine wheel, the nozzle vanes being positionable to control the direction of flow of the exhaust gas on the turbine wheel;
    a sensor system operable to provide an engine speed signal and a fuel quantity signal;
    a boost controller coupled with the sensor system to receive the engine speed and fuel quantity signals, the boost controller operable to generate an open loop desired position signal for the nozzle vanes and a closed loop desired position signal based on the engine speed signal and the fuel quantity signal, and to transmit one of the open and closed loop desired position signals to an actuator, the actuator being connected to move the nozzle vanes toward the desired position, as a function of the engine speed and fuel quantity signals.

8. A method for controlling a variable geometry turbocharger having a vane, comprising:
    determining an engine speed;
    determining a fuel quantity;

determining a closed loop vane position as a function of the engine speed and the fuel quantity;

determining an open loop vane position as a function of the engine speed and the fuel quantity; and selecting one of the closed and open loop vane positions as a function of the engine speed and fuel quantity.

9. The method of claim 8, further comprising controlling the vane to the selected one of the closed and open loop vane positions.

10. The method of claim 8 wherein selecting one of the closed and open loop vane positions comprises:

selecting the closed loop vane position when the fuel quantity is greater than a first predetermined value or the engine speed is greater than a second predetermined value; and selecting the open loop vane position when the fuel quantity is less than a third predetermined value and the engine speed is less than a fourth predetermined value.

11. The method of claim 8, further comprising determining an ambient pressure, and wherein the closed loop vane position is further a function of the ambient pressure.

* * * * *